United States Patent Office 2,755,368
Patented July 17, 1956

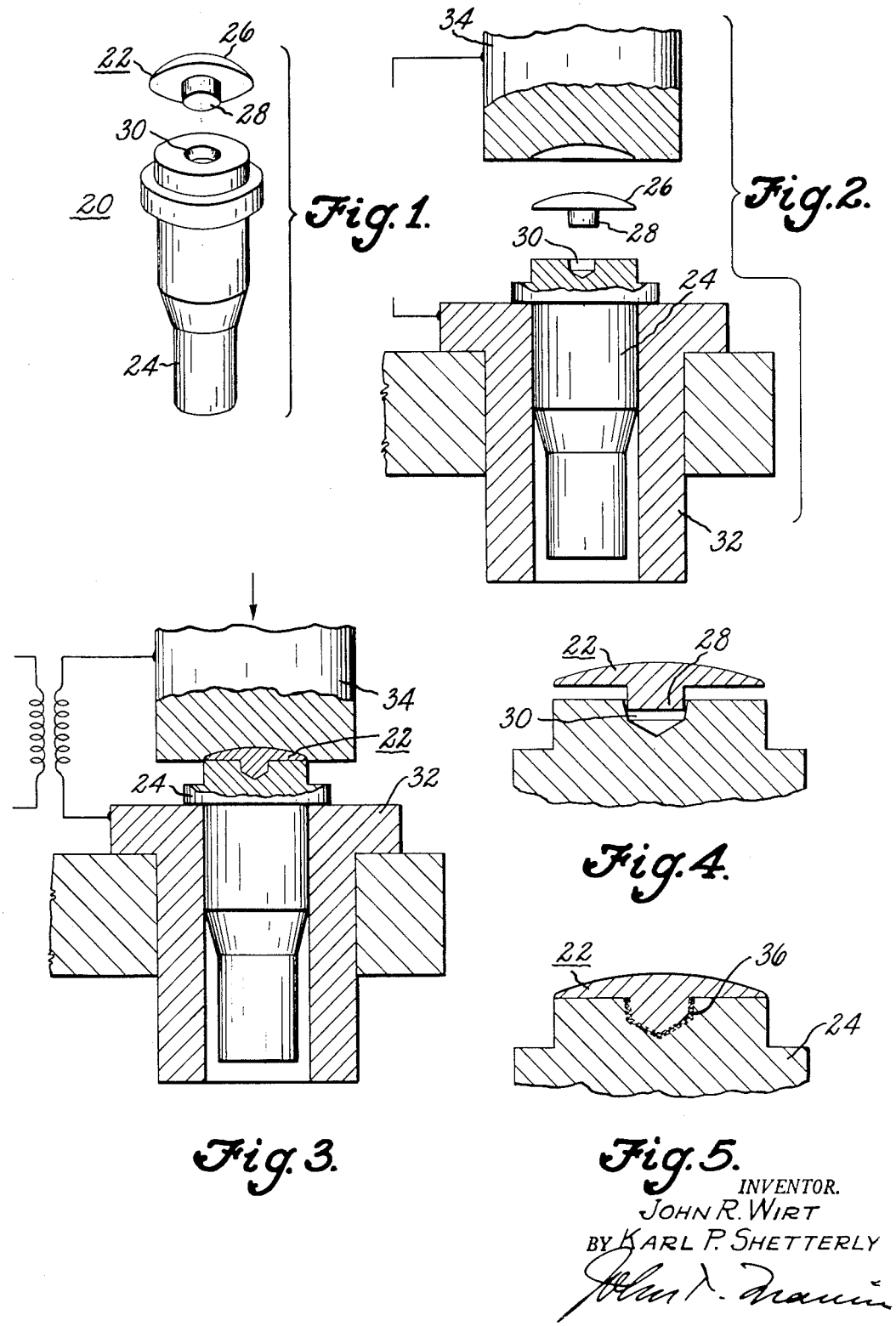

2,755,368

WELDING METHOD

John R. Wirt and Karl P. Shetterly, Anderson, Ind., assignors to General Motors Corporation, Detroit, Mich., a corporation of Delaware Application November 27, 1953, Serial No. 394,764

2 Claims. (Cl. 219—10)

This invention relates to a method of welding and is particularly concerned with a method for welding together two dissimilar metals that have melting points within a relatively close range.

It is, therefore, an object of this invention to provide a method for welding together two dissimilar metals having melting points in close proximity to one another wherein an intermetallic compound is formed during the welding operation without in any way deforming or otherwise affecting the parts being welded.

Another object of the invention is to provide a method for welding a contact to a support wherein the contact is silver or silver alloy and wherein the support is brass, copper or bronze or other cupreous alloy.

Another object of the invention is to provide a resistance welding method for welding a contact to a support member wherein the contact includes a shank thereon which is a drive fit within a cavity in the contact member and wherein the drive fit is accomplished through pressure applied by a resistance welding electrode so that the shank of the contact and the adjacent surface of the support member reach a semi-plastic condition during the insertion operation whereupon an intermetallic compound is formed for producing a strong weld having good electrical conductivity therethrough.

Further objects and advantages of the present invention will be apparent from the following description, reference being head to the accompanying drawings, wherein preferred embodiments of the present invention are clearly shown.

In the drawings:

Fig. 1 is an expanded view of a contact and support therefor.

Fig. 2 is an expanded view showing a welding fixture with the contact and support in expanded form.

Fig. 3 is a view of the welding fixture with the contact and support in bonded relation.

Fig. 4 is an enlarged view in cross section showing the preferred form of shank and cavity on the contact and support respectively.

Fig. 5 is an enlarged view in cross section showing the assembled contact and support wherein the intermetallic alloy is shown in shaded lines.

The welding of silver contacts to copper, brass or bronze support members is a difficult procedure in view of the relative proximity of the melting points of the two parts being welded together, for example, pure copper melts at 1981° F., whereas pure silver melts at 1761° F. This condition requires very accurate and close controls in order to obtain a satisfactory weld between the parts without deforming the parts due to softening of the metals therein.

We have devised a new and improved method for resistance welding silver or silver alloy contacts to copper or copper alloy supports wherein an intermetallic alloy is formed at the interface between said elements and wherein, due to the specific steps of the method, no distortion or deformation of the parts is noted nor do the parts have to be machined with a high degree of accuracy.

In Fig. 1 of the drawings, a contact assembly 20 is shown which includes a contact member 22 preferably of silver or silver alloy and a support member 24 of copper or copper alloy. The contact 22 includes a contact face or flange portion 26 having an extending shank 28 thereon while the support member 24 includes a depression or hole 30 therein for receiving the shank 28. The shape and relative size of these parts are rather important to the success of the invention and, as noted in Fig. 4, the shank 28 of the contact 22 is preferably cylindrical in form whereas the hole or depression 30 in the support 24 is slightly tapered. The outer extremity of the hole 30 preferably has a diameter greater than the diameter of the shank 28 and the diameter of the hole 30 decreases progressively toward its bottom which may be either rounded or angled according to the manner by which the hole is formed in the support. In this connection, this hole may be either coined or machined as desired since no great degree of accuracy is required. The cubic capacity of the hole 30 is preferably equal to or slightly less than the cubic capacity of the shank portion 28 of the contact. This is not a limitation although it is preferred. The only specific limitation which must be followed is that the diameter of the cylindrical shank 28 is greater than the diameter of the hole adjacent the lower end of the shank when the parts are in assembled relation. In this manner, when the parts are to be assembled, as noted in Fig. 2, the support 24 is placed in a fixture 32 which forms one part of the resistance welding circuit, the contact 22 is then positioned and placed in the hole 30, as shown in Fig. 4, and an upper punch member 34 is descended thereon which carries the other side of the resistance welding circuit. As the punch 34 descends, it forces the contact 22 under high pressure into the hole 30 until the flange portion 26 of the contact abuts the top surface of the terminal or support member 24. This position is shown in Fig. 3. During this entire pressing operation, a high temperature is being produced between the abutting portions of the cylindrical shank 28 of the contact and the walls of the hole 30. In fact, the resistance initially at this junction is very high since due to the tapered walls of the hole 30, the shank 28 has merely a line contact therearound. As the contact is pressed downwardly, it is deformed progressively to fill the hole or at least to conform to the shape of the hole to the extent that the shank extends therein. Since the electrical resistance is initially high due to the limited area of contact, a superficial melting or a plastic condition occurs adjacent the surface wherein diffusion between the contact and support metal creates an intermetallic compound or alloy bond between the two parts. This is shown at 36 in Fig. 5 in the shaded area. The under face of flange 26 of contact 22 and the mating surface on the support 24 do not generally bond together to any noticeable degree since the flange portion 26 of the contact 22 is generally not heated to a condition of plasticity, although under specific conditions, for example, when the shaank 28 is greater volumetrically than the hole 30, some bonding may occur, either directly or by deformation of the excess metal in the shank.

We have found that contact assemblies 20 may be formed in a very inexpensive manner by the process noted since the dimensional tolerances are not critical due to the taper of the wall of the hole 30 and that the hole 30 may be coined in place rather than machined if desired which further reduces the cost of the assembly. Furthermore, contact 22 is firmly welded or attached to the support 24 by an intermetallic bond existent at the interface between the contact and the support which yields a continuous electrical path of low resistance.

A specific example of dimensions which may be used is as follows: The hole may be coined in place so that the bottom thereof is more or less rounded and wherein the maximum depth is .050" and wherein the hole diameter at the top is from .060" to .066" with a slight taper toward the bottom thereof in the order of from .003 to .010". The shank of the contact is preferably between .040" to .046" long and the diameter of the shank of the contact may vary from .059" to .063", always terminating in a dimension that is less than the tolerance of the hole. It will be seen from these dimensions that the contact shank may be made to enter the hole but will never bottom therein since there is interference due to the taper. Furthermore, in most instances, the volume of the shank is substantially equal to the volume of the hole although as previously stated if proper interference on the taper walls of the hole are provided, this is not a necessary limitation. It is also apparent that the shank does not necessarily have to be cylindrical but may be of any shape so long as it progressively deformed as it is forced into the hole so as to become conformed thereto.

While the embodiments of the present invention as herein disclosed, constitute preferred forms, it is to be understood that other forms might be adopted.

What is claimed is as follows:

1. A method of electrically welding one member to another member, the steps comprising; providing one of said members with a generally cylindrical shank, providing the other of said members with a depression therein having a progressively ever-decreasing diameter, wherein the largest diameter is greater than the diameter at the end of said shank and the smallest diameter is less than any diameter on said shank, assembling the two members with the shank partially positioned in said depression, applying a welding current to said two members and simultaneously forcing said shank into said depression for simultaneously electrically heating the metal adjacent the depression and the shank to cause a weld and simultaneously conform the shape of the shank to the shape of the depression.

2. A method for electrically welding a contact to a support wherein the contact includes a major portion of silver and the support is predominantly copper, the steps comprising; providing the contact with a generally cylindrical shank, providing the support with an open depression having a tapered bore wherein the open end thereof has a diameter greater than the diameter of said shank and wherein the other end of said bore has a diameter less than the diameter of said shank whereby a portion of said bore is of insufficient diameter to permit free entry of said shank therein, assembling said contact and support as opposite sides of a welding circuit, applying a welding current to said circuit for heating said shank and support and simultaneously forcing said shank into conformed relation with said depression without deforming the main body of the contact or its support and thereby welding the contact to the support at the contiguous interfaces by a silver-copper diffusion alloy.

References Cited in the file of this patent

UNITED STATES PATENTS

| | | |
|---|---|---|
| 1,858,883 | Cook et al. | May 17, 1932 |
| 2,086,221 | Gwyn | July 6, 1937 |